(12) United States Patent
Cooke et al.

(10) Patent No.: US 7,999,727 B2
(45) Date of Patent: Aug. 16, 2011

(54) RADAR HIGH FREQUENCY MODULE

(75) Inventors: Neil Cooke, Gosport (GB); Tim Coupland, Indian River (CA); Jos Duivenvoorden, Trent River (CA); Adrian George Garrod, Southampton (GB); Katherine Moore, Southampton (GB)

(73) Assignee: Siemens Milltronics Process Instruments, Inc., Peterborough (CA)

( * ) Notice: Subject to any disclaimer, the term of this patent is extended or adjusted under 35 U.S.C. 154(b) by 17 days.

(21) Appl. No.: 12/695,656

(22) Filed: Jan. 28, 2010

(65) Prior Publication Data

US 2011/0025553 A1    Feb. 3, 2011

(30) Foreign Application Priority Data

Jan. 28, 2009  (EP) .................................... 09001197

(51) Int. Cl.
  *G01S 13/00*   (2006.01)
(52) U.S. Cl. .................................... 342/175; 343/700 R
(58) Field of Classification Search .................. 342/175; 343/700 R
See application file for complete search history.

(56) References Cited

U.S. PATENT DOCUMENTS

| 5,757,323 | A | 5/1998 | Spencer |
| 6,366,245 | B1 | 4/2002 | Schmidt et al. |
| 6,462,700 | B1 | 10/2002 | Schmidt et al. |
| 6,614,404 | B1 | 9/2003 | Schmidt et al. |
| 6,667,722 | B1 | 12/2003 | Schmidt et al. |
| 6,828,801 | B1 * | 12/2004 | Burdick et al. ............ 324/658 |
| 2008/0105966 | A1 * | 5/2008 | Beer et al. .................. 257/690 |
| 2010/0127386 | A1 * | 5/2010 | Meyer-Berg ............... 257/698 |

FOREIGN PATENT DOCUMENTS

DE    198 59 002    6/2000

* cited by examiner

*Primary Examiner* — Thomas H Tarcza
*Assistant Examiner* — Timothy A Brainard
(74) *Attorney, Agent, or Firm* — Cozen O'Connor

(57) ABSTRACT

A radar high frequency module having at least one distance piece mounted at the flat top wall of the shielding cover for supporting the shielding cover on the printed circuit board without mechanical contact of the downwardly extending side walls of the shielding cover with the printed circuit board to allow alignment of a rod antenna to a patch antenna arranged on the printed circuit board with greater precision. The side walls may be fixed to the printed circuit board by a conductive adhesive.

10 Claims, 2 Drawing Sheets

RADAR HIGH FREQUENCY MODULE

BACKGROUND OF THE INVENTION

1. Field of the Invention

The invention relates to a radar high frequency module comprising a printed circuit board carrying microwave components including a patch antenna, a shielding cover having a flat top wall and downwardly extending side walls and being positioned on the printed circuit board to cover the microwave components, and a dielectric rod antenna extending through and being held in a hole in the top wall of the shielding cover and being transmissively coupled to the patch antenna.

2. Description of the Related Art

A dielectric rod antenna may be used as a system antenna or as a pre-focusing member for illuminating a dielectric lens placed in front of the dielectric rod antenna to form narrow beams. Alternatively, the radiation may be fed into other beam forming type devices, such as a horn, a waveguide extended horn or a reflector antenna.

U.S. Pat. No. 6,366,245 B1 discloses a radar high frequency module of the above-mentioned type wherein the dielectric rod antenna is held in a bushing in the shielding cover. Actually, and as disclosed in the corresponding DE 198 59 002 A1, the figures show a hole rather than a bushing, in which hole or bushing the dielectric rod antenna may be inserted in an injection molding process. The printed circuit board is disposed on a base plate to which the shielding cover is fixed at three fixing points by screws, bonding or the like.

U.S. Pat. No. 5,757,323 shows a similar radar high frequency module where the dielectric rod antenna is adjustably mounted in a thread in the shielding cover. The dielectric rod antenna comprises a tubular tapered section adjacent the patch antenna.

The performance of the radar module is strongly dependant on the alignment of the dielectric rod antenna to the patch antenna. Thus, especially as the radar frequency becomes higher, it is necessary to align the rod to the patch with greater precision and to maintain this placement in a robust fashion which can be easily handled during assembly of the complete radar product. For example, at 77 GHz typically the rod must be aligned to the patch with a precision of 0.2 mm.

SUMMARY OF THE INVENTION

It is therefore an object of the invention to provide an arrangement for precisely aligning a dielectric rod antenna to a patch antenna of a radar high frequency module.

This and other objects and advantages are achieved in accordance with the invention in a radar high frequency module by mounting at least one distance piece at the top wall of the shielding cover and supporting the shielding cover on the printed circuit board without mechanical contact of the side walls with the printed circuit board.

In accordance with the invention, no mechanical contact is provided between the side walls of the shielding cover and the printed circuit board. As a result, the shielding cover, dielectric rod antenna and distance piece which constitute a single assembly can be easily moved for correctly aligning the rod antenna to the patch antenna. Thus, the assembly can be placed on the circuit board using conventional circuit board assembly equipment, such as a pick and place machine. The at least one distance piece provides a gap between the side walls of the shielding cover and the printed circuit board and a defined distance between the dielectric rod antenna and the patch antenna.

In a preferred embodiment, three distance pieces are arranged in a triangular configuration to ensure that the flat top wall of the shielding cover is parallel to the printed circuit board surface.

Preferably, one of the distance pieces is integrally formed with the dielectric rod antenna. To this end, the dielectric rod antenna may comprise a recess at its end facing the patch antenna. The dielectric rod antenna rests with the outer edge of the recess on the printed circuit board and the recess accommodates the patch antenna.

The shielding cover may be easily manufactured from metal in a stamping process. The dielectric rod antenna and the at least one distance piece may be attached to the shielding cover using an injection-molding process which removes the need for precision machined mechanical parts, while still maintaining the precise location of the rod antenna relative to the patch antenna.

On the side carrying the microwave component, the printed circuit board may comprise a trench in which the shielding cover can be placed. The width and depth of the trench is sufficient so that the side walls of the shielding cover at their distal ends loosely fit into the trench, and sufficient space is provided in the trench so that the shielding cover may be moved for correctly aligning the rod antenna to the patch antenna.

The side walls of the shielding cover may be fixed at their distal ends to the printed circuit board by a conductive adhesive for electrically contacting the shielding cover to the printed circuit board and for sealing the interior of the shielding cover. In embodiments in which the trench is provided in the printed circuit board, the trench is filled with a bead of the adhesive. The shielding cover is then placed onto the printed circuit board so that the edges of the cover can rest within the trench in contact with the as yet uncured adhesive previously placed there.

Furthermore, fiducial marks are preferably arranged on the printed circuit board outside the area covered by the shielding cover and in defined distances to the patch antenna. The tip of the dielectric rod antenna can then be used as a spatial reference when placing the shielding cover (including the dielectric rod antenna and the at least one distance piece) relative to the fiducial marks.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An example of the radar high frequency module according to the present invention will now be described with reference to the accompanying drawings, in which.

DETAILED DESCRIPTION OF THE PRESENTLY PREFERRED EMBODIMENTS

Figure 1:
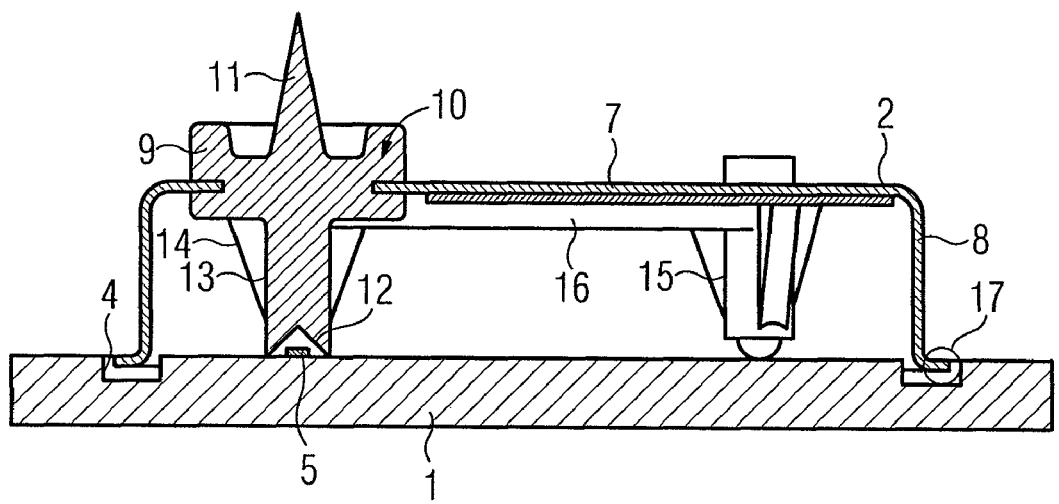
FIG. 1 is a longitudinal, cross-sectional schematic view of the radar module comprising a printed circuit board and a shielding cover.

FIG. 1 shows the completed radar high frequency module which consists of a printed circuit board 1 and a stamped shielding cover 2 attached to the printed circuit board 1.

Figure 2:
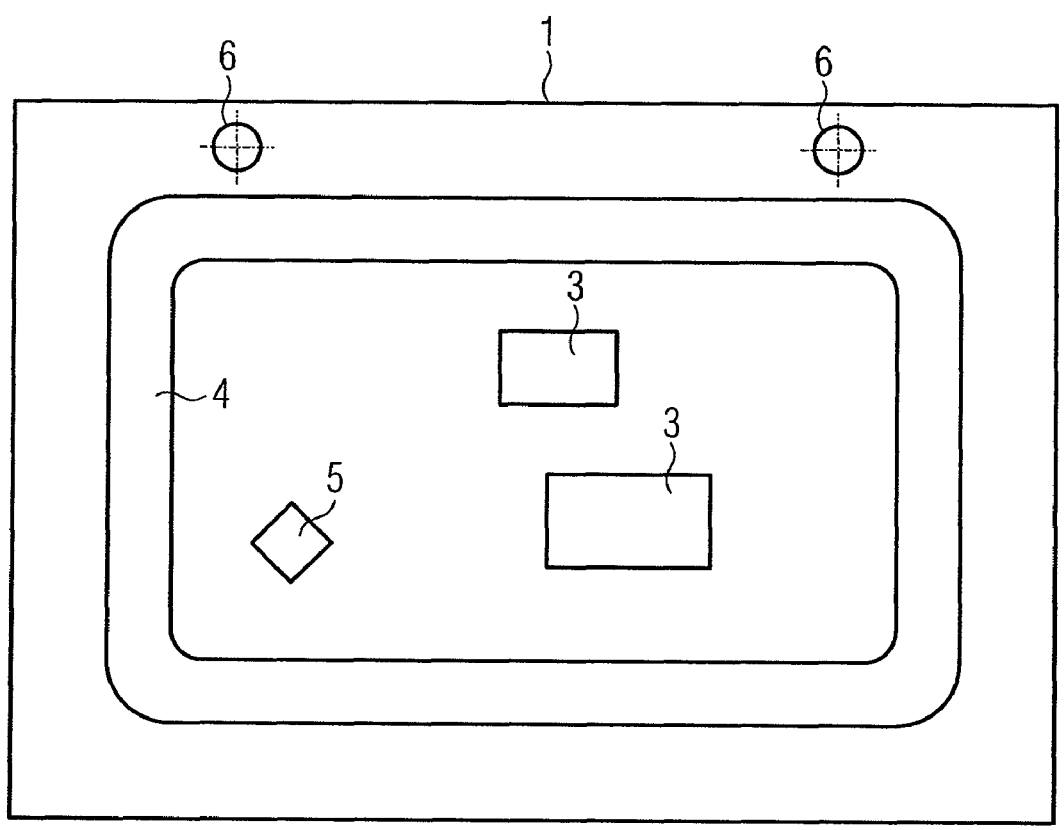
FIG. 2 is a top view of the bare printed circuit board.

FIG. 2 shows a top view of the bare, i.e., unpopulated, printed circuit board 1. The printed circuit board 1 is composed of one or more layers of, for example, FR4/LCP and is manufactured using a conventional printed circuit board (PCB) manufacturing process used for high frequency boards, i.e., plating, photoresist, chemical etching and laser ablation to create pockets 3 for Monolithic Microwave Integrated Circuits (MMICs) in the form of bare dies. As part of the same laser ablation process, a trench 4 is created in which the shielding cover 2 will be placed. A transmitting/receiving patch antenna 5 is created using standard PCB manufacturing techniques. Fiducial marks 6 are created using the same standard PCB manufacturing techniques, because of the precision nature of these techniques, the position of the patch antenna 5 relative to the fiducial marks 6 is tightly controlled and precisely known. The number and position of the fiducial marks 6 is not important as long as their position relative to the patch antenna 5 is precisely controlled.

Returning to FIG. 1, the shielding cover 2 has a flat top wall 7 and downwardly extending side walls 8 and is positioned on the printed circuit board 1 to cover the microwave components, i.e., the patch antenna 5. A dielectric rod antenna 9 is injection-molding inserted into a hole 10 in the top wall 7 of the shielding cover 2. The dielectric rod antenna 9 is at one end transmissively coupled to the patch antenna 5 and comprises, outside the shielding cover 2, a tapered section ending in a tip 11. At its end facing the patch antenna 5, the dielectric rod antenna 9 comprises a recess 12 which accommodates the patch antenna 5. The dielectric rod antenna 9 rests with the outer edge of the recess 12 on the printed circuit board 1, thus establishing a distance piece 13 which supports the shielding cover 2 on the printed circuit board 1 such that the side walls 8 of the shielding cover 2 fit loosely into the trench 4 without mechanical contact with the printed circuit board 1.

Two additional distance pieces 14 and 15 are injection-molding inserted into respective further holes in the top wall 7 of the shielding cover 2. Thus, the shielding cover 2, the dielectric rod antenna 9 and the distance pieces 13, 14, 15 constitute a single assembly which can be easily moved for correctly aligning the rod antenna 9 to the patch antenna 5. The distance pieces 13, 14 and 15 are arranged in a triangular configuration to ensure that the flat top wall 7 of the shielding cover 2 is parallel to the surface of the printed circuit board 1.

Figure 3:
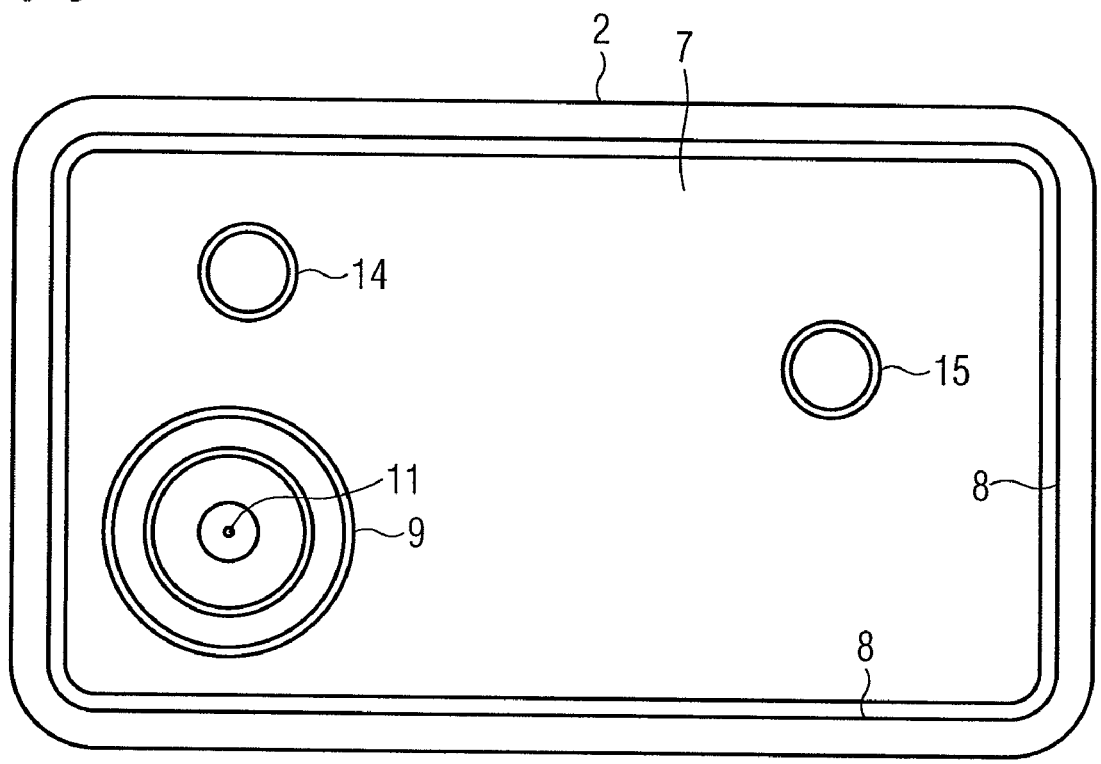
FIG. 3 is a top view of the shielding cover.
Figure 4:
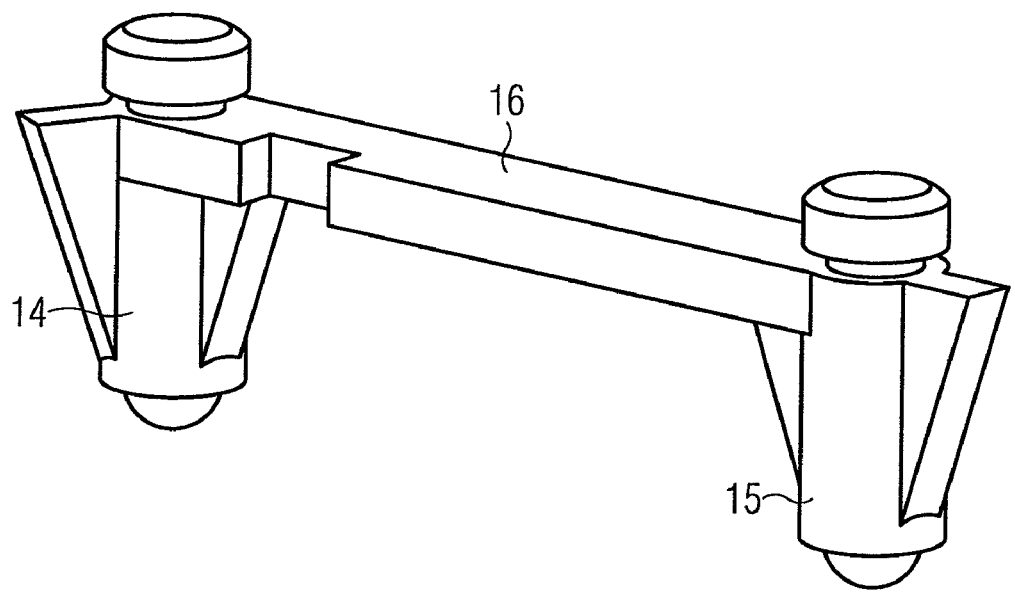
FIG. 4 is a perspective view of two distance pieces for supporting the shielding cover on the printed circuit board.

FIG. 3 shows a top view of the shielding cover. FIG. 4 shows a perspective view of the two additional distance pieces 14 and 15 which are connected by a bar 16, thus forming a single component.

The assembly process of the radar high frequency module comprises the following steps:

The assembly process begins with the step of placing the MMICs into the pockets 3 and connecting them to the printed circuit board 1 using wire bonding techniques. This is a standard manufacturing technique for circuits of this type and is performed with commercially available assembly equipment.

Next, the trench 4 is filled with a bead of a conductive adhesive 17. The shielding cover 2 (with the dielectric rod 9 and the further distance pieces 14 and 15 already installed) is then placed onto the printed circuit board 1 so that the side walls 8 of the shielding cover 2 rest within the trench 4 in contact with the as yet uncured adhesive 17 previously placed there. The width of the trench 4 is sufficient so that the shielding cover 2 fits loosely into the trench 4, and sufficient space is provided in the trench 4 so that the cover 2 may be moved to ensure that the dielectric rod tip 11 is aligned correctly to the patch antenna 5. The placement is performed by commercially available automatic placement equipment which can, for example, include optical sensing devices such as video cameras, which are able to very precisely determine the spatial alignment of the dielectric rod antenna tip 11 and the fiducial marks 6 and automatically adjust the position of the shielding cover 2 until the desired spatial alignment is achieved. Here, the spatial alignment of the fiducial marks 6 to the patch antenna 5 is precisely known. As a result, this guarantees the precise spatial alignment of the dielectric rod tip 11 to the patch antenna 5. That the use of automatic placement equipment is not mandatory; any equipment which provides the necessary ability to precisely place the cover 2 relative to the fiducial marks 6 can be used, which could include manual devices with the necessary optical equipment.

The final step is to cure the adhesive 17 to permanently fix the shielding cover 2 into the trench 4. The resulting radar high frequency module is robust and can be handled using conventional assembly equipment such as a pick and place machine.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A radar high frequency module, comprising:
    a printed circuit board carrying microwave components including a patch antenna;
    a shielding cover having a flat top wall and downwardly extending side walls, the flat top wall having a hole and the shielding cover being positioned on the printed circuit board to cover the microwave components;
    a dielectric rod antenna extending through and being held in the hole in the flat top wall of the shielding cover and being transmissively coupled to the patch antenna; and
    at least one distance piece mounted at the top wall of the shielding cover and supporting the shielding cover on the printed circuit board at a supported position, wherein the shielding cover is supported by the at least one distance piece without direct mechanical contact of the side walls with the printed circuit board at the supported position.

2. The radar high frequency module according to claim 1, wherein the at least one distance piece comprises three distance pieces arranged in a triangular configuration.

3. The radar high frequency module according to claim 2, wherein one distance piece of the three distance pieces is integrally formed with the dielectric rod antenna.

4. The radar high frequency module according to claim 3, wherein an end of the dielectric rod antenna comprises a recess which accommodates the patch antenna and wherein an outer edge of the recess of the dielectric rod antenna rests on the printed circuit board.

5. The radar high frequency module according to claim 1, wherein the at least one distance piece is integrally formed with the dielectric rod antenna.

6. The radar high frequency module according to claim 1, wherein the dielectric rod antenna is injection-molded into the hole in the flat top wall of the shielding cover.

7. The radar high frequency module according to claim 1, wherein the at least one distance piece is injection-molded into the hole in the flat top wall of the shielding cover.

8. The radar high frequency module according to claim 1, wherein the printed circuit board includes a trench on a side carrying the microwave components, and wherein distal ends of the downwardly extending side walls of the shielding cover are moveably received the trench.

9. The radar high frequency module according to claim 1, wherein the distal ends of the downwardly extending side walls of the shielding cover are fixed to the printed circuit board by a conductive adhesive.

10. The radar high frequency module according to claim 1, further comprising at least one fiducial mark arranged on the printed circuit board outside an area covered by the shielding cover and at a defined distance to the patch antenna.

* * * * *